United States Patent
Lee et al.

(10) Patent No.: US 9,473,968 B2
(45) Date of Patent: Oct. 18, 2016

(54) METHOD AND APPARATUS FOR CONFIGURING COOPERATIVE CELL IN WIRELESS COMMUNICATION SYSTEM

(71) Applicant: Samsung Electronics Co. Ltd., Suwon-si, Gyeonggi-do (KR)

(72) Inventors: Ok-Seon Lee, Suwon-si (KR); Jung-Soo Jung, Seongnam-si (KR); Rakesh Taori, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 13/855,275

(22) Filed: Apr. 2, 2013

(65) Prior Publication Data
US 2013/0258974 A1    Oct. 3, 2013

(30) Foreign Application Priority Data
Apr. 2, 2012 (KR) .................. 10-2012-0033834

(51) Int. Cl.
*H04L 1/00* (2006.01)
*H04W 24/10* (2009.01)
*H04W 48/20* (2009.01)

(52) U.S. Cl.
CPC ............. *H04W 24/10* (2013.01); *H04W 48/20* (2013.01)

(58) Field of Classification Search
CPC ...... H04W 24/10; H04B 7/022; H04B 7/024
USPC ........................................ 370/330
See application file for complete search history.

(56) References Cited

U.S. PATENT DOCUMENTS

| | | |
|---|---|---|
| 2006/0223538 A1 | 10/2006 | Haseba et al. |
| 2008/0200202 A1 | 8/2008 | Montojo et al. |
| 2009/0181708 A1 | 7/2009 | Kim et al. |
| 2010/0027456 A1* | 2/2010 | Onggosanusi et al. ....... 370/312 |
| 2010/0056170 A1* | 3/2010 | Lindoff et al. ............. 455/452.1 |
| 2010/0142466 A1 | 6/2010 | Palanki et al. |
| 2010/0298006 A1 | 11/2010 | Ko et al. |
| 2010/0304751 A1 | 12/2010 | Ji et al. |
| 2011/0098072 A1 | 4/2011 | Kim et al. |
| 2011/0205983 A1 | 8/2011 | Bharadwaj et al. |
| 2011/0207494 A1 | 8/2011 | Zhu et al. |

(Continued)

FOREIGN PATENT DOCUMENTS

| | | |
|---|---|---|
| EP | 1 377 101 A1 | 1/2004 |
| EP | 1 740 007 A1 | 1/2007 |

(Continued)

OTHER PUBLICATIONS

Fujitsu:"Considerations on PUCCH Enhancement for UL CoMP", R1-120750, XP050563275.

*Primary Examiner* — Mark Rinehart
*Assistant Examiner* — Matthew Hopkins
(74) *Attorney, Agent, or Firm* — Jefferson IP Law, LLP

(57) ABSTRACT

A method for configuring a cooperative cell by a master Base Station (BS) in a wireless communication system is provided. The method includes instructing a Mobile Station (MS) and adjacent BSs to measure channels, receiving channel measurement results from the MS and the adjacent BSs, and determining at least one BS constituting a cooperative cell according to the channel measurement results. The at least one BS constituting the cooperative cell provides one of an UpLink (UL) service and a DownLink (DL) service to a same MS.

24 Claims, 9 Drawing Sheets

(56) References Cited

U.S. PATENT DOCUMENTS

| | | |
|---|---|---|
| 2011/0269459 A1 | 11/2011 | Koo et al. |
| 2012/0020319 A1* | 1/2012 | Song et al. ............ 370/330 |
| 2012/0057516 A1 | 3/2012 | Ahn et al. |
| 2012/0088535 A1 | 4/2012 | Wang et al. |
| 2014/0119312 A1* | 5/2014 | Doetsch ............ H04B 7/024 370/329 |

FOREIGN PATENT DOCUMENTS

| | | |
|---|---|---|
| KR | 10-2010-0081913 A | 7/2010 |
| KR | 10-0991792 B1 | 11/2010 |
| KR | 10-2010-0125693 A | 12/2010 |
| KR | 10-2011-0081877 A | 7/2011 |
| KR | 10-2011-0127266 A | 11/2011 |
| WO | 2011/071291 A2 | 6/2011 |

* cited by examiner

METHOD AND APPARATUS FOR CONFIGURING COOPERATIVE CELL IN WIRELESS COMMUNICATION SYSTEM

PRIORITY

This application claims the benefit under 35 U.S.C. §119 (a) of a Korean patent application filed on Apr. 2, 2012 in the Korean Intellectual Property Office and assigned Serial No. 10-2012-0033834, the entire disclosure of which is hereby incorporated by reference.

BACKGROUND OF THE INVENTION

1. Field of the Invention

The present invention relates to a wireless communication system. More particularly, the present invention relates to a method and apparatus for configuring a cooperative cell in a wireless communication system.

2. Description of the Related Art

In order to support high-capacity data services, a wireless communication system using a high-frequency band, such as a millimeter Wave (mmW) band, may be considered to be a next-generation wireless communication system. In the case having a system using a high-frequency band, the system's Base Station (BS) has a small cell radius due to a short communication distance between the BS and a Mobile Station (MS), thus causing an increase in the number of BSs which are installed in order to provide coverage of the MS. When the mobility of MSs is considered, a decrease in a cell radius of the BSs and an increase in the number of BSs may lead to an increase in the number of inter-cell handovers of the MSs in the system, thus causing an increase in system overhead.

Compared to other wireless communication systems, the next-generation wireless communication system using a high-frequency band may have a high failure probability for a wireless link between an MS and a BS due to the movement of the MS and/or the obstacles, such as physical bodies, around the MS. Therefore, there is a need for a way to provide more efficient services to users and to improve reliability of the provided services, taking into account the characteristics of the high-frequency bands to be used in the next-generation wireless communication system.

In order to complement the vulnerable high-frequency band link, a new cooperative cell has been introduced in which multiple BSs may simultaneously serve one MS. The cooperative cell is comprised of multiple BSs, known as 'member BSs', which have a good channel state and which can allocate resources to an MS, and may be formed by taking into account the measurement results for a DownLink (DL) of each BS by the MS and a cell load of each BS. One of the member BSs serves as a master BS that manages the cooperative cell, and the other BSs serve as slave BSs. The BSs constituting the cooperative cell may vary depending on the movement of the MS and the loads of the BSs. The multiple BSs belonging to the cooperative cell may obtain diversity gain by transmitting the same data to one MS at the same time or with a time difference, and may reduce the entire communication time used to transmit the same amount of data to one MS, by transmitting their own different data to one MS.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for configuring an UpLink (UL) cooperative cell that is different from a DownLink (DL) cooperative cell for the same Mobile Station (MS) in a cooperative cell-based wireless communication system.

Another aspect of the present invention is to provide a method and apparatus for determining at least one Base Station (BS) constituting the UL cooperative cell using the DL measurement results obtained by a Mobile Station (MS).

Further another aspect of the present invention is to provide a method and apparatus for measuring a quality of a UL to an MS by each BS and determining at least one BS constituting a UL cooperative cell according to the measurement.

Still another aspect of the present invention is to provide a method and apparatus for efficiently allocating resources between a master BS and at least one slave BS in a cooperative cell-based wireless communication system.

In accordance with an aspect of the present invention, a method for configuring a cooperative cell by a master Base Station (BS) in a wireless communication system is provided. The method includes instructing a Mobile Station (MS) and adjacent BSs to measure channels, receiving channel measurement results from the MS and the adjacent BSs, and determining at least one BS constituting a cooperative cell according to the channel measurement results. The at least one BS constituting the cooperative cell may provide one of an UpLink (UL) service and a DownLink (DL) service to a same MS.

In accordance with another aspect of the present invention, an apparatus for configuring a cooperative cell by a master Base Station (BS) in a wireless communication system is provided. The apparatus includes a controller for instructing a Mobile Station (MS) and adjacent BSs to measure channels, receiving channel measurement results from the MS and the adjacent BSs, and determining at least one BS constituting a cooperative cell according to the channel measurement results. The at least one BS constituting the cooperative cell may provide one of an UpLink (UL) service and a DownLink (DL) service to a same MS.

In accordance with further another aspect of the present invention, a method for configuring a cooperative cell by a Mobile Station (MS) in a wireless communication system is provided. The method includes receiving a channel measurement indication from a master Base Station (BS), upon network entry of the MS, determining a channel measurement result according to the channel measurement indication, and transmitting the channel measurement results to the master BS, and receiving cooperative cell configuration information indicating information about at least one BS constituting a cooperative cell as determined by the master BS. The at least one BS constituting the cooperative cell may provide one of an UpLink (UL) service and a DownLink (DL) service to a same MS.

In accordance with yet another aspect of the present invention, an apparatus for configuring a cooperative cell by a Mobile Station (MS) in a wireless communication system is provided. The apparatus includes a controller for receiving channel measurement indication from a master Base Station (BS) upon network entry of the MS, determining channel measurement results according to the channel measurement indication, transmitting the channel measurement results to the master BS, and receiving, from the master BS, cooperative cell configuration information indicating information about at least one BS constituting a cooperative cell as determined by the master BS. The at least one BS constituting the cooperative cell may provide one of an UpLink (UL) service and a DownLink (DL) service to a same MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
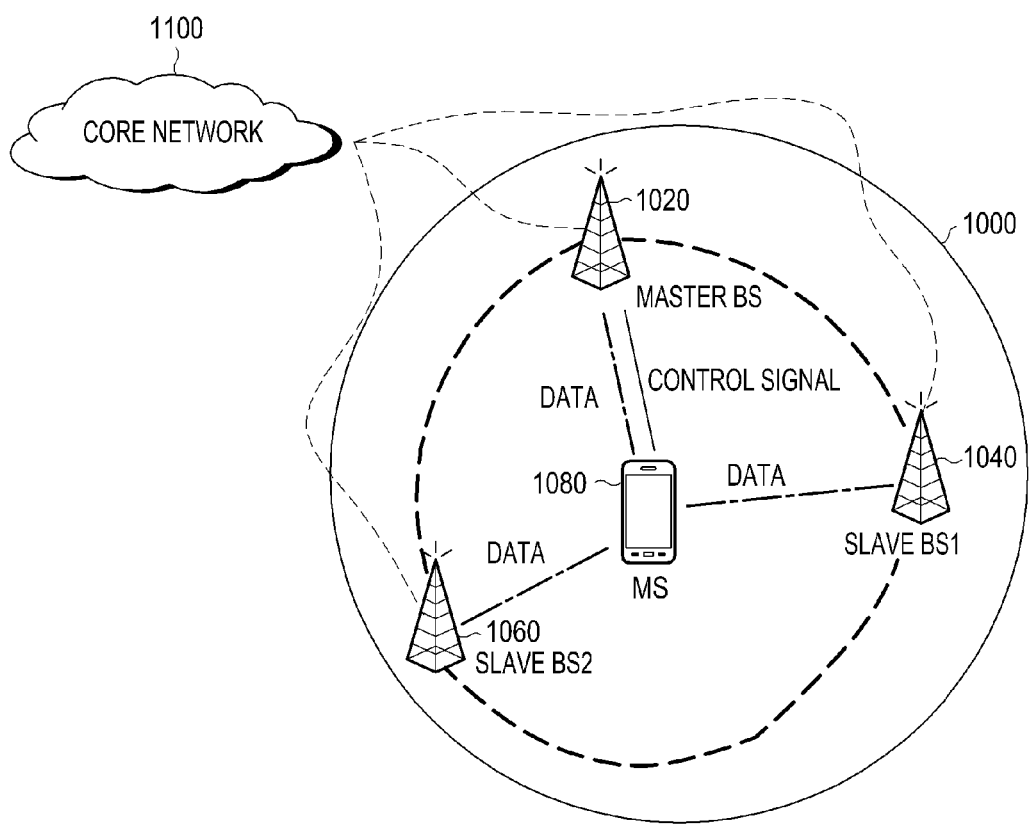
FIG. 1 illustrates configuration of a cooperative cell according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term 'master Base Station (BS)', as used herein, may refer to a macro BS or other similar and/or suitable types of BSs that may be a master BS, and the term 'slave BS', as used herein, may refer to a small cell, such as a femto cell, a pico cell, a micro cell, a relay, and other similar and/or suitable types of BSs that may be a slave BS.

It will be apparent to those of ordinary skill in the art that the present invention may be applied to a Cooperative Multi-Point (CoMP) mobile communication system in which multiple BSs provide a service to a Mobile Station (MS) using a CoMP technique.

A cooperative cell for providing more efficient services to a user may have characteristics of high-frequency bands to be used in the wireless communication system. The cooperative cell is a virtual cell comprised of multiple BSs, which are located around one MS and which provide a service to the MS. In a case where the cooperative cell includes two BSs, one BS serves as a master BS and allocates resources of the cooperative cell, whereas the other BS serves as a slave BS and helps the master BS provide a service to the MS.

The cooperative cell may increase the reliability of links, which are vulnerable in a high-frequency band, as both a master BS and a slave BS serve an MS, and may also increase a throughput to the MS by providing multiple quality links to the MS. In addition, the cooperative cell may reduce a delay which may be caused by a handover operation of an MS located on the edge of the cell. In a wireless communication system having the cooperative cell, since the MS performs data exchange with multiple BSs belonging to the cooperative cell, the handover operation used in a related art wireless communication system is not required when the MS moves between the BSs belonging to the cooperative cell. As a result, the cooperative cell-based wireless communication system may advantageously manage borderless mobility of the MS.

However, in the wireless communication system using the high-frequency band, an UpLink (UL) and a DownLink (DL) may not be identical in terms of the coverage because of their asymmetry. In other words, since a UL and a DL of a BS may not be completely symmetrical, a service coverage area by a DL of one BS may be different from a service coverage area by a UL of the same BS. In addition, since the UL and DL are different from each other in terms of their channel conditions and available resources, the DL measurement results based on the configuration of the cooperative cell may not be appropriate for UL data transmission. In other words, depending on the situation, a particular BS may serve more UL data while another BS may serve more DL data. Therefore, the BSs constituting a cooperative cell may vary when serving DL data in the cooperative cell as compared to when serving UL data in the cooperative cell.

Furthermore, in the wireless communication system using a high-frequency band, wireless links may be unstable because they use the high-frequency band, so not all of the BSs in the cooperative cell may receive data from an MS and the master BS may also fail to receive data from the MS. Moreover, in the wireless communication system using a high-frequency band, a backhaul delay between BSs may be disregarded, sometimes, because the BSs use the high-frequency band. Therefore, there is a need for a way to configure a cooperative cell comprised of the MS and multiple BSs.

The present exemplary embodiments provide a method and apparatus for selecting member BSs in a cooperative cell of a communication system comprised of member BSs that serve one MS in cooperation in order to provide a more efficient service to a user, taking into account the characteristics of the high-frequency bands to be used in the next-generation communication system. The cooperative cell, as referred to herein, may be a virtual cell comprised of multiple BSs, which are located around one MS and which provide a service to the MS. Although the cooperative cell is assumed to operate in, for example, millimeter Wave (mmW) bands, the present invention is not limited thereto, and a cooperative cell may also operate in other similar and/or suitable frequency bands.

FIG. 1 illustrates configuration of a cooperative cell according to an exemplary embodiment of the present invention.

Referring to FIG. 1, a cooperative cell 1000 includes an MS 1080 and a plurality of member BSs, including a master BS 1020, a slave BS1 1040 and a slave BS2 1060, which may also be referred to as the slave BSs 1040 and 1060, that exchange data with the MS 1080. In the present exemplary embodiment of the present invention, the number of member BSs constituting the cooperative cell 1000 is assumed to be 3 for convenience of description, but the present invention is not limited thereto, and the number of member BSs constituting a cooperative cell may be any suitable number of member BSs.

The master BS 1020 may transmit both control signals and data to the MS 1080, and manage other BSs, such as the slave BS1 1040 and the slave BS2 1060. Each of the slave BS1 1040 and the slave BS2 1060 does not transmit control signals to the MS 1080, but rather, transmits only the data to the MS 1080, unless it receives a particular instruction from the master BS 1020. However, under control of the master BS 1020, the slave BSs 1040 and 1060 may also transmit a control signal to the MS 1080. The master BS 1020 and the slave BSs 1040 and 1060 may transmit the same data or different data to the MS 1080. Also, the master BS 1020 and the slave BS1 1040 and the slave BS2 1060 may be directly connected to a core network 1100, and may be directly connected to each other in a wired or wireless manner.

Reliability of the vulnerable links may be increased as all of the master BS 1020, the slave BS1 1040, and the slave BS2 1060 serve the MS 1080, and the throughput may be increased by providing multiple quality links to the MS 1080. The cooperative cell 1000 may be configured for the purpose of providing high-speed data services to the MS 1080, and it will be apparent to those of ordinary skill in the art that the cooperative cell may be configured even though the MS is not located at an edge of the cell.

Also, the cooperative cell 1000 may be reconfigured according to a state of communication between the MS 1080 and its adjacent BSs. In other words, a BS whose communication with the MS 1080 is continuously delayed may be excluded from the cooperative cell 1000. In contrast, channel states of BSs adjacent to the MS 1080 may be measured, and based thereon, the adjacent BSs having a good channel state, which may be greater than or equal to a reference or predetermined value, may be accepted as new member BSs constituting the cooperative cell.

In an exemplary embodiment of the present invention, the UL and DL are not matched at all times in terms of their respective service coverage areas. In order to address the problems that occur as the service coverage area of the UL is smaller than the service coverage area of the DL in normal cases, unlike the related art method in which the same cooperative cell-constituting BSs provide a UL service and a DL service to one MS, the present exemplary embodiment includes a new algorithm for selecting the BSs constituting the cooperative cell. The new algorithm separately selects BSs constituting a cooperative cell providing a UL service to one MS and separately selects BSs constituting a cooperative cell providing a DL service to the same MS. The cooperative cell-constituting BSs for a UL service and the cooperative cell-constituting BSs for a DL service may be matched in part or completely. Or in other words, the cooperative cell-constituting BSs for a UL service may include some, all and/or only the BSs constituting the cooperative cell for a DL service.

Figure 2:
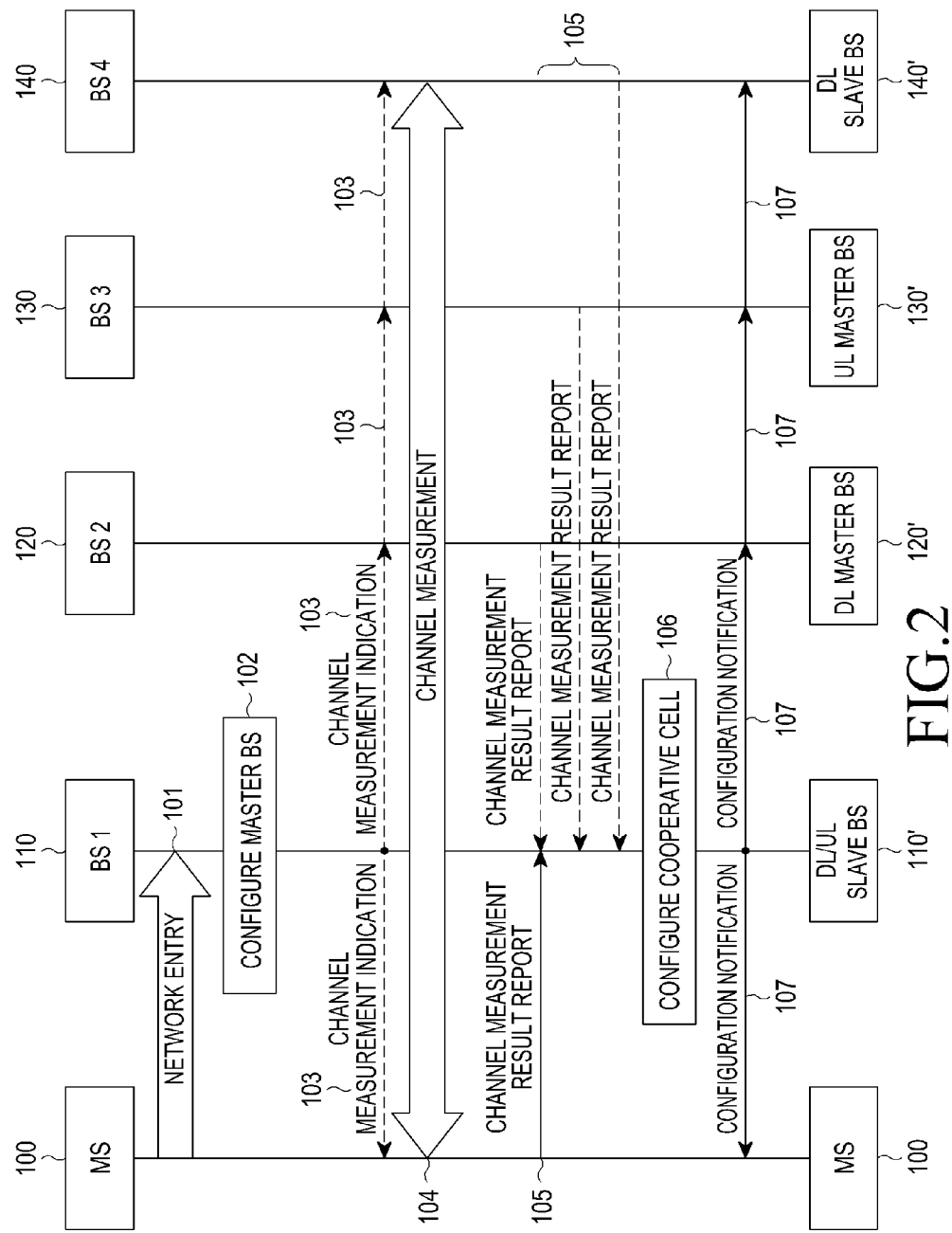
FIG. 2 illustrates a method for configuring a cooperative cell according to an exemplary embodiment of the present invention.

FIG. 2 illustrates a method for configuring a cooperative cell according to an exemplary embodiment of the present invention.

Referring to FIG. 2, in step 101, an MS 100 performs network entry and sets one BS, such as a BS#1 110 from among its adjacent BSs, as a serving BS through a cell selection procedure in accordance with the existing network entry procedure. In step 102, the BS#1 110 sets itself as a master BS, and may also be referred to as the master BS 110, herein. However, the present invention is not limited thereto, and the master BS may be changed to be any suitable BS.

Thereafter, in step 103, the master BS 110 sends a channel measurement indication message to the MS 100 and adjacent BSs 120, 130 and 140, instructing them to measure channels between the MS and the adjacent BSs 120, 130 and 140. The adjacent BSs 120, 130 and 140 that will participate in channel measurement may be determined in order of the distance closest to the master BS 110 based on information which was shared between BSs when the BSs were initially set up. Otherwise, the MS 100 may report, to the master BS 110, adjacent BS information it collected during the network entry of step 101, so that the master BS 110 may determine the adjacent BSs 120, 130 and 140 that will participate in the channel measurement.

Specifically, the master BS 110 transmits information used to measure a UL channel of the MS 100, to the adjacent BSs 120, 130 and 140 in step 103. Then, in step 103, the MS 100 receives information about a time at which it will transmit a reference signal, such as a pilot and a preamble, to the adjacent BSs 120, 130 and 140, and the adjacent BSs 120, 130 and 140 may also receive, in step 103, information about the time at which the reference signal from the MS is to be transmitted.

Upon receiving the channel measurement indication in step 103, then, in step 104, the MS 100 and the adjacent BSs 120, 130 and 140 perform channel measurement and deliver the channel measurement results to the master BS 110 in step 105. Specifically, the MS 100 measures channels for the master BS 110 and the adjacent BSs 120, 130 and 140 in step 104, and then, in step 105, transmits the measurement results to the master BS 110 using a measurement report message. Furthermore, the MS 100 transmits a reference signal in step 104, for UL measurement by adjacent BSs 120, 130 and 140. In addition, the adjacent BSs 120, 130 and 140 optionally transmit their channel measurement results to the master BS 110 in step 105.

In step 106, the master BS 110 configures a cooperative cell based on at least one of the channel measurement results, channel conditions, path losses, and cell loads. In other words, the master BS 110 determines BSs that will constitute a cooperative cell. In the exemplary embodiment of FIG. 2, the master BS 110 determines the adjacent BS 120 to be a DL master BS 120', the adjacent BS 130 to be a UL master BS 130', and the adjacent BS 140 to be a DL slave BS 140'.

The criteria for configuring a cooperative cell are defined in Table 1 below. In FIG. 2, dotted lines specify operations for Criteria 2. The operations illustrated using the dotted lines may be omitted if the adjacent BSs 120, 130 and 140 do not perform UL channel measurement for the MS 100.

TABLE 1

| | Definition |
| --- | --- |
| Criteria 1 | Path loss from measurement result report from MS |
| Criteria 2 | UL signal strength measurement result by adjacent BSs |

When configuring the cooperative cell, the master BS 110 configures BSs to be the UL master BS 130' and the DL master BS 120' based on Criteria 1 or Criteria 2. In addition, when configuring the cooperative cell, the mater BS 110 may differently configure UL cooperative cell-constituting BSs and DL cooperative cell-constituting BSs based on Criteria 1 or Criteria 2.

In step 107, the master BS 110 delivers cooperative cell configuration information to the MS 100 and the adjacent BSs 120, 130 and 140 in the cooperative cell configured in step 106. The cooperative cell configuration information includes information about the determined cooperative cell-constituting BSs. The cooperative cell configured in step 106 may be periodically updated, or may be updated based on the following event.

The contents of the event for updating the cooperative cell may include the following. Specifically, for a respective BS, if signal strength is less than a threshold for a predetermined time or if a cell load is greater than a threshold, then the respective BS may be excluded from cooperative cell-constituting BSs. If signal strength of a new BS, other than the cooperative cell-constituting BSs, is greater than or equal to a threshold for a given time, then the new BS may be included in the cooperative cell-constituting BSs.

In the exemplary embodiment of FIG. 2, the MS 100 first accessed the BS 110 and determines it to be the master BS 110 in step 102, but after the channel measurement of step 104, the adjacent BS 120 is switched to be the DL master BS 120', the master BS 110 is determined to be a DL/UL slave BS 110', the adjacent 130 is determined to be the UL master BS 130', and the adjacent 140 is determined to be the DL slave BS 140' according to the channel measurement results. As illustrated in FIG. 2, that the master BS 110 may be replaced according to the channel measurement results, and the DL master BS 120' and the UL master BS 130' may be determined to be different BSs, and the DL slave BSs, including the DL slave BS140' and UL slave BSs (not shown) may be determined to be different BSs.

Figure 3:
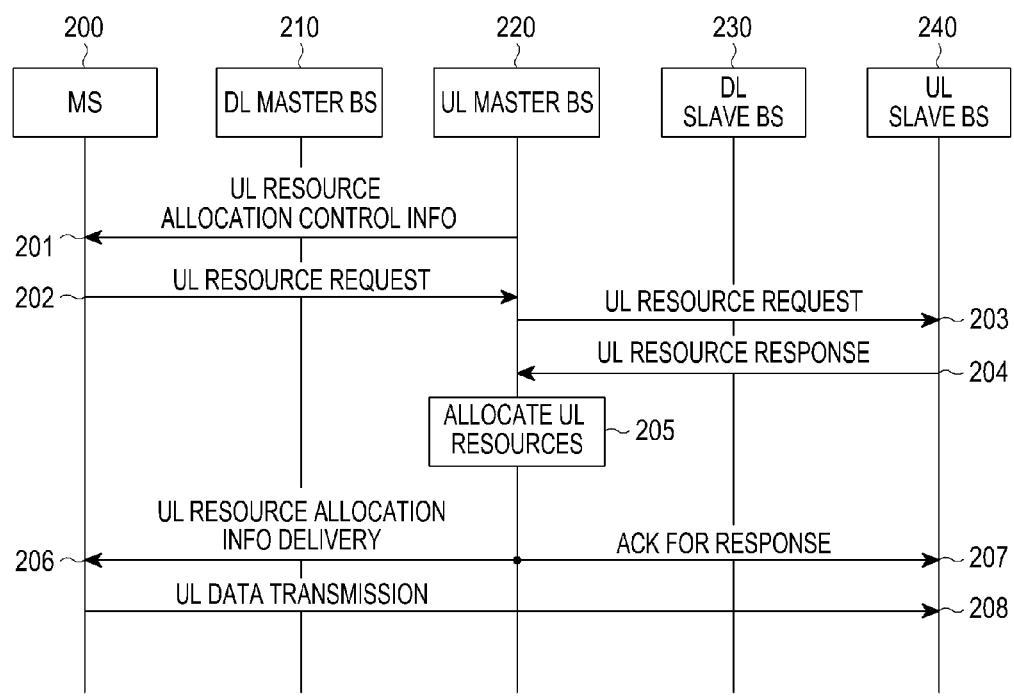
FIGS. 3 and 4 illustrate a method for allocating UpLink (UL) resources in a cooperative cell according to a first exemplary embodiment of the present invention.
Figure 4:
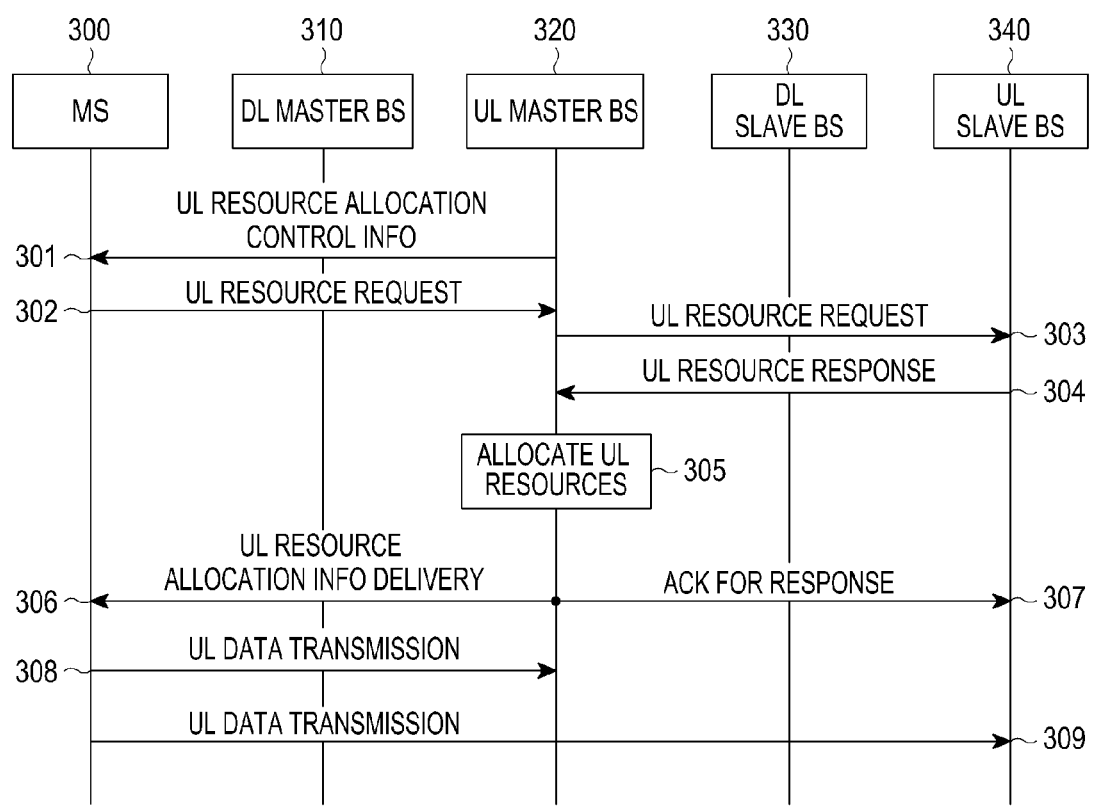

FIGS. 3 and 4 illustrate a method for allocating UL resources in a cooperative cell according to a first exemplary embodiment of the present invention.

Referring to FIG. 3, a method for allocating UL resources in a cooperative cell according to the first exemplary embodiment of the present invention is illustrated.

In the first exemplary embodiment of the present invention, it is assumed that a DL master BS and a UL master BS are different. However, the present invention is not limited thereto, and if the DL master BS and the UL master BS are the same, then the contents performed by the UL master BS in FIG. 3 are performed by any master BS with no separate mark of DL or UL.

In step 201, a UL master BS 220 transmits UL resource allocation control information to an MS 200. The UL resource allocation control information may include information about how an MS requests UL resources. Specifically, in step 201, the UL mater BS 220 transmits information about a resource request cycle and resources to be used upon resource request and also transmits the UL resource allocation control information so that the MS 200 may request UL resources periodically or each time it has data to transmit. If the MS 200 has not reached a given cycle or the MS 200 desires to transmit data unexpectedly, then the MS 200 may inform the UL master BS 220 of a need to allocate resources by random access.

In step 202, if there is data to transmit or if the MS 200 has reached a given cycle, the MS 200 transmits a UL resource request, which includes information about the amount of its UL transmission data, to the UL master BS 220. Based on the information received in step 202, the UL master BS 220 allocates UL resources taking into account its cell load and the channel state between the MS 200 and the UL master BS 220 and UL slave BS(s), such as a UL slave BS 240, from among the BSs constituting the cooperative cell. For example, the UL master BS 220 requests UL resources from the UL slave BS 240 in step 203, receives a UL resource response from the UL slave BS 240 in step 204, and, then, in step 205, determines to allocate UL resources of the UL master BS and UL slave BS, according to the UL resource response received in step 204.

The UL slave BS 240 may transmit the UL resource response, including information about the amount of allocable resources from among the requested resources, in step 204, and the amount of resources may be any amount of allocable resources, including zero (0) resources. The UL master BS 220 delivers the resource allocation results to the MS 200 in step 206, and delivers the resource allocation results as an ACKnowledgement (ACK) to the UL slave BS 240 in step 207. For example, in FIG. 3, the UL slave BS 240 may respond, in step 204, with its ability to allocate the resources requested by the UL master BS 220, and the UL master BS 220 may acknowledge the response in step 207. Furthermore, the present invention is not limited to the order of steps 206 and 207 illustrated in the exemplary embodiment of FIG. 3 and the order of the steps 206 and 207 may be any suitable and/or similar order. After steps 206 and 207, the MS 200 transmits UL data to the UL slave BS 240 based on the received UL resource allocation information in step 208.

Referring to FIG. 4, another example of a method for allocating UL resources in a cooperative cell according to a first exemplary embodiment of the present invention is illustrated. Compared to FIG. 3, step 301 to 307 of FIG. 4 are similar to step 201 to 207 of FIG. 3, however, FIG. 4 further includes step 308, and differences between FIGS. 3 and 4 are as follows.

As shown in FIG. 3, the MS 200 is allocated only the UL resources of the UL slave BS 240 and transmits UL data using the allocated UL resources in step 208. However, in step 308, the MS 300 may transmit UL data using UL resources of a UL master BS 320 or a third UL slave BS (not shown), which is a BS included in a UL cooperative cell, depending on the UL resource allocation results obtained in step 305. Accordingly, in FIG. 4, an MS 300 transmits UL data to a UL slave BS 340 depending on the UL resource allocation results, which are obtained in step 305, in step 309.

Figure 5:
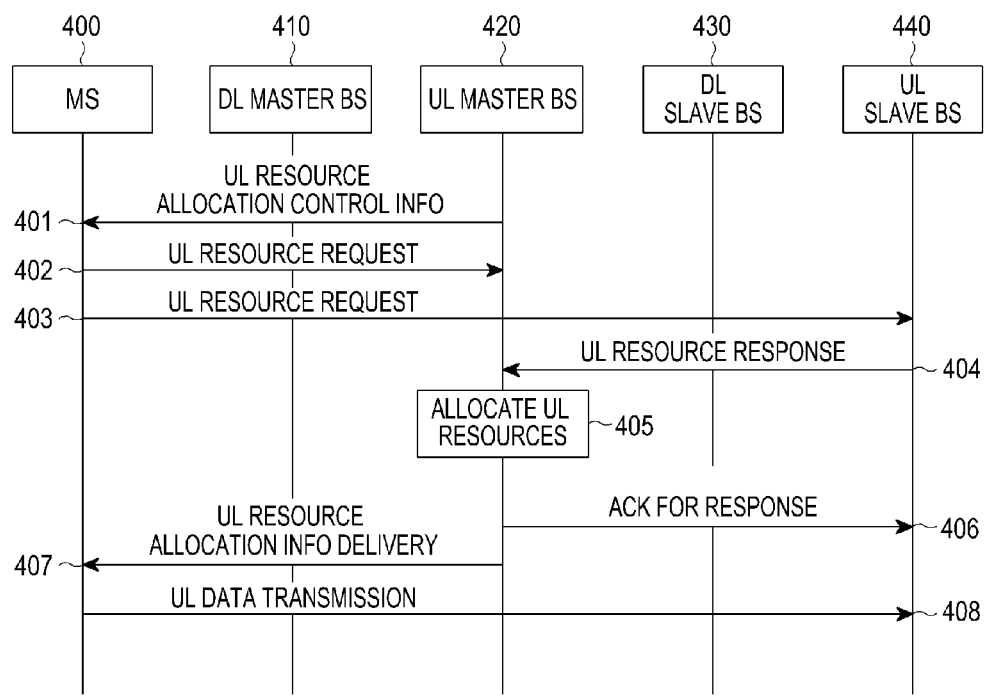
FIG. 5 illustrates a method for allocating resources in a cooperative cell according to a second exemplary embodiment of the present invention.

FIG. 5 illustrates a method for allocating resources in a cooperative cell according to a second exemplary embodiment of the present invention.

Referring to FIG. 5, in step 401, a UL master BS 420 transmits UL resource allocation control information to an MS 400. The control information includes information about how an MS requests UL resources. In the first exemplary embodiment of the present invention, that is the exemplary embodiments of FIGS. 3 and 4, the MS requests resources only from the UL master BS. However, in the second exemplary embodiment of the present invention, that is the present exemplary embodiment of FIG. 5, the MS may request resources even from a UL slave BS 440 that the UL master BS 420 designates in step 401. Although not illustrated, for the resource request process, the UL master BS 420 and the UL slave BS 440 may negotiate a resource request method of the MS 400 used before step 401.

Specifically, the UL master BS 420 designates a resource request cycle and resources to be used upon resource request to the UL slave BS 440 so that the MS 400 may request UL resources from either or both of the UL master BS 420 and the UL slave BS 440 periodically or every time the MS 400 has data to transmit, and the UL slave BS 440 informs the UL master BS 420 of its recognition of the designation. The MS 400 may inform either or both of the UL master BS 420 and the UL slave BS 440 of the need to allocate resources by random access, if it has not reached a given cycle or if the MS 400 desires to transmit data unexpectedly. This informing of the UL master BS 420 and/or the UL slave BS 440 may also be designated as control information in step 401. If there is data to transmit or if the MS 400 has reached a given cycle, the MS 400 transmits information about the amount of its UL transmission data to the UL master BS 420 and the UL slave BS 440. This process is shown as the UL resource requests of steps 402 and 403.

In step 404, the UL slave BS 440 may transmit, to the UL master BS 420, a UL resource response including information about the amount of allocable resources in response to the UL resource request of step 403, and the amount of resources may be any amount of resources, including zero (0) resources. In step 405, based on the information received in steps 402 and 404, the UL master BS 420 allocates UL resources taking into account its cell load and the channel state between the MS 400 and the UL master BS 420 and the UL slave BS 440 from among the BSs constituting the cooperative cell. Thereafter, in step 406, the UL master BS 420 sends an ACK message for the response received in step 404 to the UL slave BS 440.

In step 407, the UL master BS 420 transmits UL resource allocation information, including the UL resource allocation results, to the MS 400. In step 408, the MS 400 transmits UL data to the UL slave BS 440 based on the received UL resource allocation information. Although it is assumed in present exemplary embodiment that the MS 400 is allocated only the UL resources of the UL slave BS 440 and transmits UL data using the allocated UL resources in step 408, the present invention is not limited thereto, and the MS 400 may transmit UL data using UL resources of the UL master BS 420 or a third UL slave BS (not shown), which is a BS constituting the UL cooperative cell, depending on the UL resource allocation results obtained in step 405.

Figure 6:
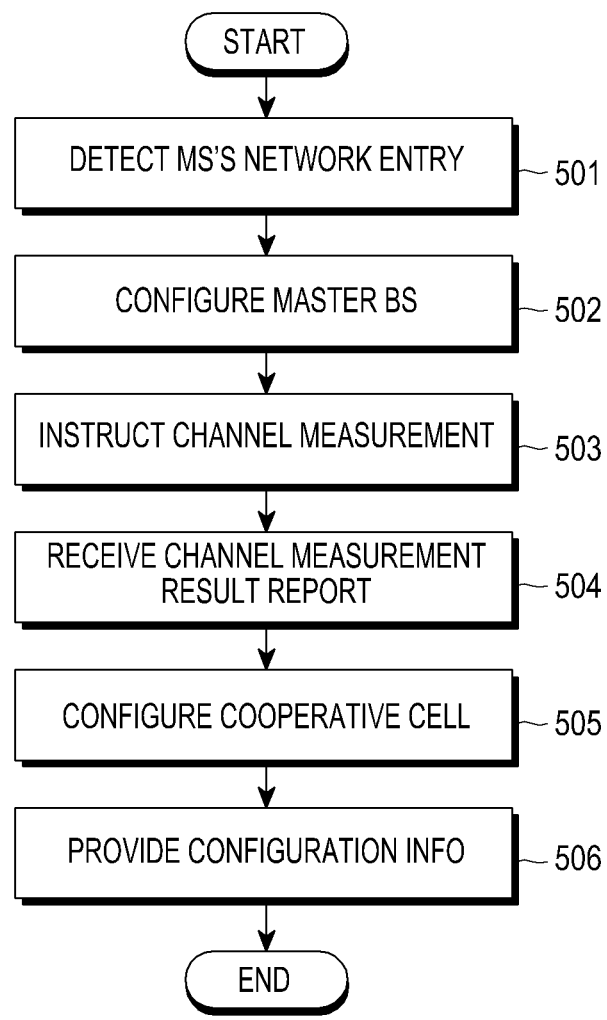
FIG. 6 illustrates a method for configuring a cooperative cell by a master Base Station (BS) according to an exemplary embodiment of the present invention.

FIG. 6 illustrates a method for configuring a cooperative cell by a master BS according to an exemplary embodiment of the present invention.

Referring to FIG. 6, in step 501, the master BS detects or recognizes an MS's network entry. A serving BS, which is determined through a cell selection process, is a master BS, and the master BS, in step 502, configures itself as the master BS. Thereafter, in step 503, the master BS instructs an MS and its adjacent BSs to perform channel measurement. Upon receiving the channel measurement indication of step 503, the MS or its adjacent BSs perform channel measurement depending on the channel measurement indication.

Next, in step 504, the master BS receives channel measurement results from the MS and its adjacent BSs. In step 505, the master BS configures a cooperative cell based on the channel measurement results, channel conditions, cell loads and the like. The criteria for configuring a cooperative cell may include Criteria 1 or Criteria 2 listed in Table 1. However, the present invention is not limited thereto, and the criteria for configuring a cooperative cell are not limited to Criteria 1 or Criteria 2 in Table 1 and well as different and/or additional criteria may be used. In step 506, the master BS provides configuration information, which includes the cooperative cell configuration information, to the MS and the adjacent BSs in the configured cooperative cell.

Figure 7:
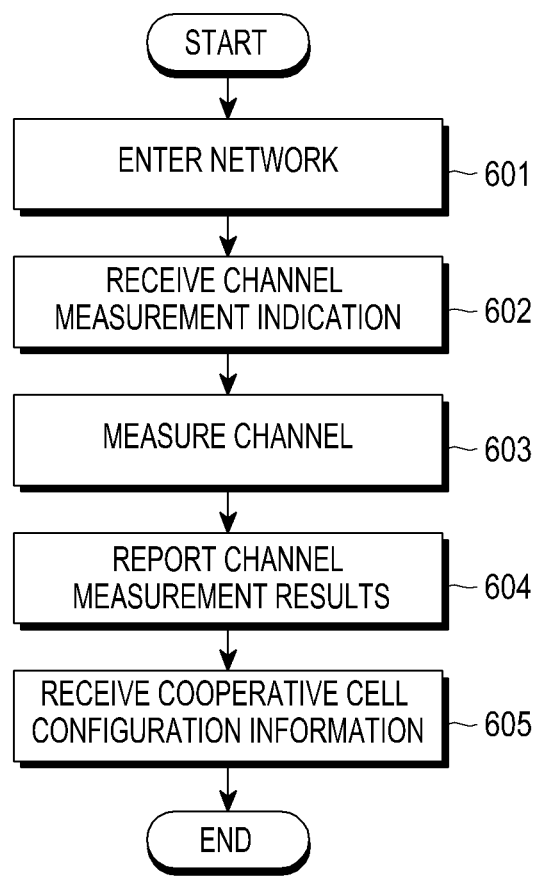
FIG. 7 illustrates a method for configuring a cooperative cell by an Mobile Station (MS) according to an exemplary embodiment of the present invention.

FIG. 7 illustrates a method for configuring a cooperative cell by an MS according to an exemplary embodiment of the present invention.

Referring to FIG. 7, the MS enters the network in step 601. Thereafter, if a master BS is determined, the MS receives channel measurement indication from the determined master BS in step 602. Upon receiving the channel measurement indication in step 602, then, in step 603, the MS performs channel measurement according to the channel measurement indication, and transmits the channel measurement results to the master BS in step 604. If a cooperative cell is configured by the master BS based on the channel measurement results, channel conditions and cell load, then the MS receives cooperative cell configuration information from the master BS in step 605.

Figure 8:
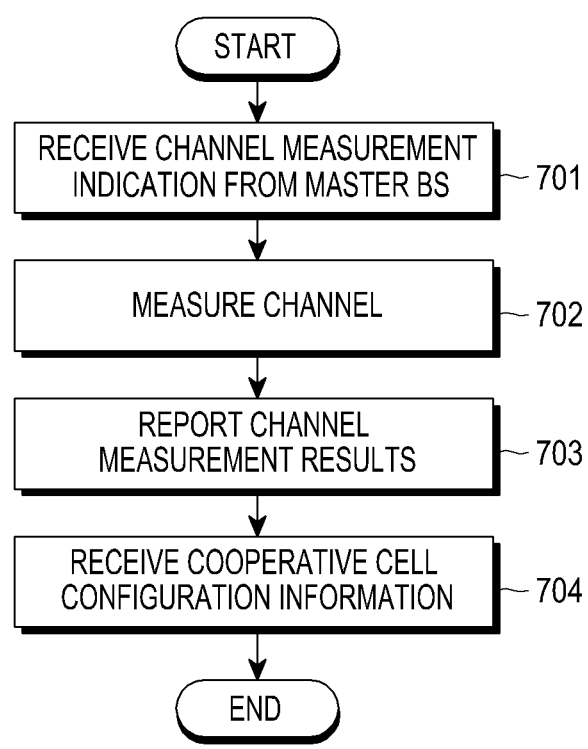
FIG. 8 illustrates a method for configuring a cooperative cell by a slave BS according to an exemplary embodiment of the present invention.

FIG. 8 illustrates a method for configuring a cooperative cell by a slave BS according to an exemplary embodiment of the present invention.

Once a master BS is determined, the slave BS receives a channel measurement indication from the determined master BS in step 701. Upon receiving the channel measurement indication, the slave BS performs channel measurement according to the channel measurement indication in step 702, and transmits the channel measurement results to the master BS of the MS in step 703. If a cooperative cell is configured by the master BS based on the channel measurement results, channel conditions and cell loads, the slave BS receives cooperative cell configuration information from the master BS in step 704.

Figure 9:
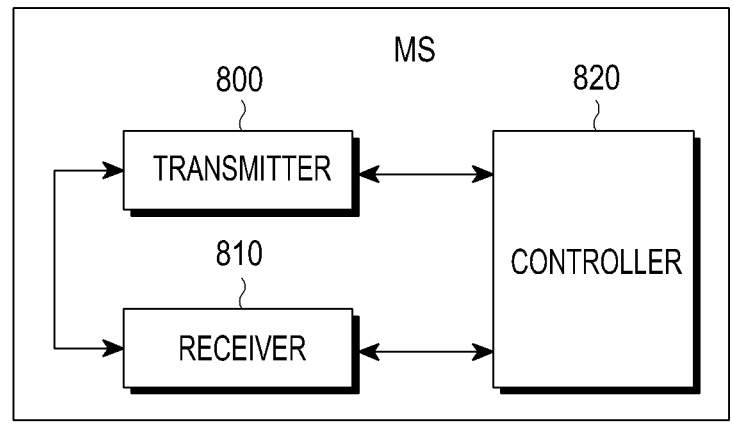
FIG. 9 is a block diagram of an MS according to an exemplary embodiment of the present invention.

FIG. 9 is a block diagram of an MS according to an exemplary embodiment of the present invention.

Referring to FIG. 9, the MS includes a transmitter 800, a receiver 810 and a controller 820. The transmitter 800 may include a transmitting module for transmitting data to a BS and the receiver 810 may include a receiving module for receiving data from the BS according to an exemplary embodiment of the present invention in a communication system. The BS which transmits data to and receives data from the MS may be a master BS and a slave BS according to an exemplary embodiment of the present invention. In accordance with the procedures described with reference to FIGS. 2 to 5 and 7, the controller 820 accesses a master BS or a slave BS, receives channel measurement indication from the master BS, performs channel measurement according to the channel measurement indication, and transmits the channel measurement results to the master BS. If a cooperative cell is configured by the master BS, then the controller 820 receives the cooperative cell configuration information from the master BS.

Figure 10:
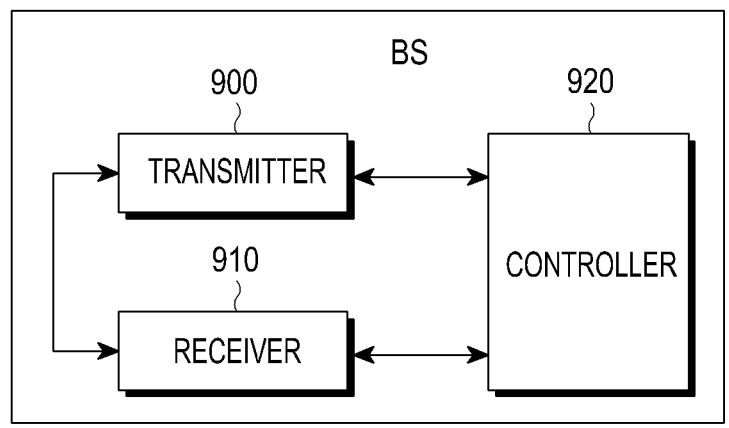
FIG. 10 is a block diagram of a BS according to an exemplary embodiment of the present invention.

FIG. 10 is a block diagram of a BS according to an exemplary embodiment of the present invention.

Referring to FIG. 10, the master BS and the slave BS, according to an exemplary embodiment of the present invention, may be implemented according to structure of FIG. 10. As shown in FIG. 10, the BS includes a transmitter 900, a receiver 910 and a controller 920. The transmitter 900 may include a transmitting module for transmitting data to an MS and the receiver 910 may include a receiving module for receiving data from an MS according to an exemplary embodiment of the present invention in a communication system. If the BS is a master BS, then the transmitter 900 and the receiver 910 may respectively include a transmitting module and a receiving module for transmitting and receiving data to and/or from a slave BS. If the BS is a slave BS, then the transmitter 900 and the receiver 910 may respectively include a transmitting module and a receiving module for transmitting and receiving data to and/or from a master BS and another slave BS.

In a case where the BS is a master BS, according to an exemplary embodiment of the present invention, as described in conjunction with FIGS. 2 to 5 and 6, upon detecting the network entry of the MS, the controller 920 recognizes that the BS itself is the master BS, instructs the MS and its adjacent BSs to perform channel measurement, and, upon receiving the channel measurement results, configures a cooperative cell taking into account Criteria 1, Criteria 2, or any other similar and/or suitable criteria. The controller 920 transmits information about the configured cooperative cell to the MS and the BSs in the cooperative cell.

Exemplary embodiments of the present invention may be implemented as computer-readable codes in a non-transitory computer-readable recording media. The non-transitory computer-readable recording media may include any suitable type of recording device for storing computer-readable data. Examples of the non-non-transitory computer-readable recording media may include Read Only Memories (ROMs), Random Access Memories (RAMs), Compact Disc (CD)-ROMs, magnetic tapes, floppy discs, optical data storage devices, and any other similar and or suitable type of recording media, and may also be implemented in the form of carrier waves (for example, transmission over the Internet). Additionally, exemplary embodiments of the present invention may be implemented as computer-readable codes executed by computer hardware, such as processors, controllers, Integrated Circuits (ICs), Application Specific ICs (ASICs), and any other similar and/or suitable hardware element that executes computer-readable codes.

As is apparent from the foregoing description, in configuring a cooperative cell comprised of multiple BSs serving one MS, the present exemplary embodiments configure different BSs for serving the UL and the DL, making it possible to overcome data transmission/reception errors caused by the difference between the UL service coverage area and the DL service coverage area and to efficiently use the UL and DL resources.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a cooperative service by a master base station (BS) in a wireless communication system, the method comprising:
   determining first BSs including a downlink (DL) master BS and at least one DL slave BS to provide a cooperative DL service to a mobile station (MS) and second BSs including an uplink (UL) master BS and at least one UL slave BS to provide a cooperative UL service to the MS, based on channel measurement results of the MS and a plurality of BSs;
   transmitting information related to the first BSs to the MS and the first BSs; and
   transmitting information related to the second BSs to the MS and the second BSs,
   wherein determining the first BSs is independent of determining the second BSs, so that the first BSs and the second BSs include same BSs or different BSs.

2. The method of claim 1, wherein each of the BSs and the second BSs is determined based on a channel measurement value greater than or equal to a predetermined threshold.

3. The method of claim 1, wherein each of the first BSs and the second BSs is determined based on at least one of channel conditions, a cell load, and a path loss.

4. The method of claim 1, wherein the first BSs are changed based on communication status between the MS and the first BSs, and the second BSs are changed based on communication status between the MS and the second BSs.

5. An apparatus for providing a cooperative service by a master base station (BS) in a wireless communication system, the apparatus comprising:
   a controller configured to:
      determine first BSs including a downlink (DL) master BS and at least one DL slave BS to provide a cooperative DL service to a mobile station (MS) and second BSs including an uplink (UL) master BS and at least one slave BS to provide a cooperative UL service to the MS, based on channel measurement results of the MS and a plurality of BSs,
      transmit information related to the first BSs to the MS and the first BSs, and
      transmit information related to the second BSs to the MS and the second BSs,
   wherein determining the first BSs is independent of determining the second BSs, so that the first BSs and the second BSs include same BSs or different BSs.

6. The apparatus of claim 5, wherein each of the first BSs and the second BSs is determined based on a channel measurement value greater than or equal to a predetermined threshold.

7. The apparatus of claim 5, wherein each of the first BSs and the second BSs is determined based on at least one of channel conditions, a cell load, and a path loss.

8. The apparatus of claim 5, wherein the first BSs are changed based on communication status between the MS and the first BSs, and the second BSs are changed based on communication status between the MS and the second BSs.

9. A method for using a cooperative service by a mobile station (MS) in a wireless communication system, the method comprising:

measuring channels between the MS and a plurality of BSs;

transmitting channel measurement results to a master BS of the plurality of BSs; and receiving, from the master BS, information related to first BSs including a downlink (DL) master BS and at least one DL slave BS to provide a cooperative DL service to the MS and second BSs including an uplink (UL) master BS and at least one UL slave BS to provide a cooperative UL service to the MS, determined based on the channel measurement results, wherein the first BSs are determined independently from the second BSs, so that the first BSs and the second BSs include same BSs or different BSs.

10. The method of claim 9, wherein each of the first BSs and the second BSs is determined based on a channel measurement value greater than or equal to a predetermined threshold.

11. The method of claim 9, wherein each of the first BSs and the second BSs is determined based on at least one of channel conditions, a cell load, and a path loss.

12. The method of claim 9, wherein the first BSs are changed based on communication status between the MS and the first BSs, and the second BSs are changed based on communication status between the MS and the second BSs.

13. An apparatus for using a cooperative service by a mobile station (MS) in a wireless communication system, the apparatus comprising:

a controller configured to:

measure channels between the MS and a plurality of BSs, transmit channel measurement results to a master BS of the plurality of BSs, and receive, from the master BS, information related to first BSs including a downlink (DL) master BS and at least one DL slave BS to provide a cooperative DL service to the MS and second BSs including an uplink (UL) master BS and at least one UL slave BS to provide a cooperative UL service to the MS, determined based on the channel measurement results, wherein the first BSs are determined independently from the second BSs, so that the first BSs and the second BSs include same BSs or different BSs.

14. The apparatus of claim 13, wherein each of the first BSs and the second BSs is determined based on a channel measurement value greater than or equal to a predetermined threshold.

15. The apparatus of claim 13, wherein each of the first BSs and the second BSs is determined based on at least one of channel conditions, a cell load, and a path loss.

16. The apparatus of claim 13, wherein the first BSs are changed based on communication status between the MS and the first BSs, and the second BSs are changed based on communication status between the MS and the second BSs.

17. A method for providing a cooperative service by a slave base station (BS) in a wireless communication system, the method comprising:

measuring channels between the slave BS and a mobile station (MS);

transmitting channel measurement results to a master BS; and receiving, from the master BS, information related to first BSs including a downlink (DL) master BS and at least one DL slave BS to provide a cooperative DL service to the MS and second BSs including an uplink (UL) master BS and at least one UL slave BS to provide a cooperative UL service to the MS, determined based on the channel measurement results, wherein the first BSs are determined independently from the second BSs, so that the first BSs and the second BSs include same BSs or different BSs.

18. The method of claim 17, wherein each of the first BSs and the second BSs is determined based on a channel measurement value greater than or equal to a predetermined threshold.

19. The method of claim 17, wherein each of the first BSs and the second BSs is determined based on at least one of channel conditions, a cell load, and a path loss.

20. The method of claim 17, wherein the first BSs are changed based on communication status between the MS and the first BSs, and the second BSs are changed based on communication status between the MS and the second BSs.

21. An apparatus for providing a cooperative service by a slave base station (BS) in a wireless communication system, the apparatus comprising:

a controller configured to:

measure channels between the slave BS and a mobile station (MS), transmit channel measurement results to a master BS, and receive, from the master BS, information related to first BSs including a downlink (DL) master BS and at least one DL slave BS to provide a cooperative DL service to the MS and second BSs including an uplink (UL) master BS and at least one UL slave BS to provide a cooperative UL service to the MS, determined based on the channel measurement results, wherein the first BSs are determined independently from the second BSs, so that the first BSs and the second BSs include same BSs or different BSs.

22. The apparatus of claim 21, wherein each of the first BSs and the second BSs is determined based on a channel measurement value greater than or equal to a predetermined threshold.

23. The apparatus of claim 21, wherein each of the first BSs and the second BSs is determined based on at least one of channel conditions, a cell load, and a path loss.

24. The apparatus of claim 21, wherein the first BSs are changed based on communication status between the MS and the first BSs, and the second BSs are changed based on communication status between the MS and the second BSs.

\* \* \* \* \*